(12) United States Patent
Narazaki

(10) Patent No.: US 12,673,549 B2
(45) Date of Patent: Jul. 7, 2026

(54) VEHICLE

(71) Applicant: TOYOTA JIDOSHA KABUSHIKI KAISHA, Aichi-ken (JP)

(72) Inventor: Akihiro Narazaki, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 296 days.

(21) Appl. No.: 18/595,414

(22) Filed: Mar. 5, 2024

(65) Prior Publication Data

US 2024/0308329 A1    Sep. 19, 2024

(30) Foreign Application Priority Data

Mar. 13, 2023    (JP) .................................. 2023-038433

(51) Int. Cl.
| | |
|---|---|
| B60K 11/08 | (2006.01) |
| B60H 1/32 | (2006.01) |
| B60K 11/04 | (2006.01) |
| B62D 35/00 | (2006.01) |

(52) U.S. Cl.
CPC .......... B60K 11/085 (2013.01); B60H 1/3205 (2013.01); B62D 35/005 (2013.01); B60H 2001/3251 (2013.01); B60K 11/04 (2013.01); B62D 35/007 (2013.01)

(58) Field of Classification Search
CPC .... B60K 11/085; B60K 11/04; B60H 1/3205; B60H 2001/3251; B62D 35/005; B62D 35/007; B62D 37/02; Y02T 10/88
See application file for complete search history.

(56) References Cited

U.S. PATENT DOCUMENTS

| | | | |
|---|---|---|---|
| 2019/0248206 A1* | 8/2019 | Sato ................... | B60H 1/00642 |
| 2023/0398857 A1* | 12/2023 | Mammeri ........... | B60K 11/085 |
| 2025/0353556 A1* | 11/2025 | Shimizu .............. | B62D 35/005 |

FOREIGN PATENT DOCUMENTS

JP    2017-013525 A    1/2017

* cited by examiner

*Primary Examiner* — Erez Gurari

(74) *Attorney, Agent, or Firm* — HAUPTMAN HAM, LLP

(57)    ABSTRACT

A vehicle comprises a grille opening, a grille shutter, an Fr spoiler, and a controller, wherein the controller is configured to open the grille shutter when the vehicle speed is less than a first threshold value or when the evaluation indices and of the temperature of the cooling target are equal to or greater than the reference values; and the controller is configured to bring the Fr spoiler into the deployed posture when the vehicle speed is equal to or greater than a second threshold value higher than the first threshold value, and to bring the Fr spoiler into the deployed posture in synchronization with the opening of the grille shutter when the vehicle speed is equal to or greater than the first threshold value and less than the second threshold value.

3 Claims, 5 Drawing Sheets

VEHICLE

CROSS REFERENCE TO RELATED APPLICATION

This application claims priority to Japanese Patent Application No. 2023-38433 filed on Mar. 13, 2023, which is incorporated herein by reference in its entirety including the specification, claims, drawings, and abstract.

TECHNICAL FIELD

This specification discloses a vehicle having a grille shutter and a movable front spoiler.

BACKGROUND

Conventionally, there has been known a vehicle including a grille shutter that enables opening and closing of a grille opening and a movable front spoiler. For example, Patent Document 1 discloses a vehicle having a grille shutter and a movable front spoiler.

Typically, the grille opening is an opening for sending air to a cooling target disposed at the front of the vehicle. The cooling target is, for example, a power source (e.g., an engine) of the vehicle, a heat exchanger (e.g., a radiator or a condenser), or both. The grille shutter is opened, for example, when the vehicle speed is low or when the temperature of the cooling target is high. This is for achieving both improvement of cooling efficiency of the cooling target and reduction of air resistance.

Here, when the front spoiler is deployed when the grille shutter is opened, the amount of air flowing into the grille opening can be increased. Therefore, by opening the grille shutter and deploying the front spoiler, the cooling target can be cooled more efficiently.

However, conventionally, the front spoiler is controlled independently of the grille shutter. As a result, the front spoiler is often not deployed even if cooling of the cooling target is required. As a result, in the case of the conventional vehicle, the cooling target cannot be efficiently cooled.

Accordingly, this specification discloses a vehicle capable of further improving cooling efficiency of a cooling target.

CITATION LIST

PATENT DOCUMENT 1: JP. 2017-013525.A

SUMMARY

A vehicle disclosed herein comprises a grille opening formed at a front end of the vehicle and configured to allow air to flow toward a cooling target; a grille shutter configured to enable the grille opening to open and close; a front spoiler disposed at a lower front portion of the vehicle and configured to be capable of changing between a storage posture and a deployed posture protruding downward of the vehicle relative to the storage posture; and a controller, wherein the controller is configured to open the grille shutter when the vehicle speed is less than a first threshold value or when an evaluation index of a temperature of the cooling target is equal to or greater than a reference value, and the controller is configured to: change the front spoiler to the deployed posture when the vehicle speed is equal to or greater than a second threshold value higher than the first threshold value; and change the front spoiler to the deployed posture in synchronization with the opening of the grille shutter when the vehicle speed is equal to or greater than the first threshold value and less than the second threshold value.

The cooling target may be an engine, and the evaluation index is a temperature of cooling water for cooling the engine.

The cooling target may be a heat exchanger that causes an air conditioning refrigerant to exchange heat with outside air, and the evaluation index may be a pressure of the air conditioning refrigerant.

The vehicle may further comprise another aerodynamic device which can be changed to a first posture and a second posture in which an aerodynamic resistance of the vehicle is reduced as compared to the first posture, wherein the other aerodynamic device may include at least one of a rear spoiler, a spat, or a side step, and the controller may be configured to change the other aerodynamic device to the second posture in synchronization with a change of the front spoiler to the deployed posture.

According to the technology disclosed in this specification, the cooling efficiency of the cooling target can be further improved.

BRIEF DESCRIPTION OF DRAWINGS

Embodiment(s) of the present disclosure will be described based on the following figures, wherein.

DESCRIPTION OF EMBODIMENT

Figure 1:
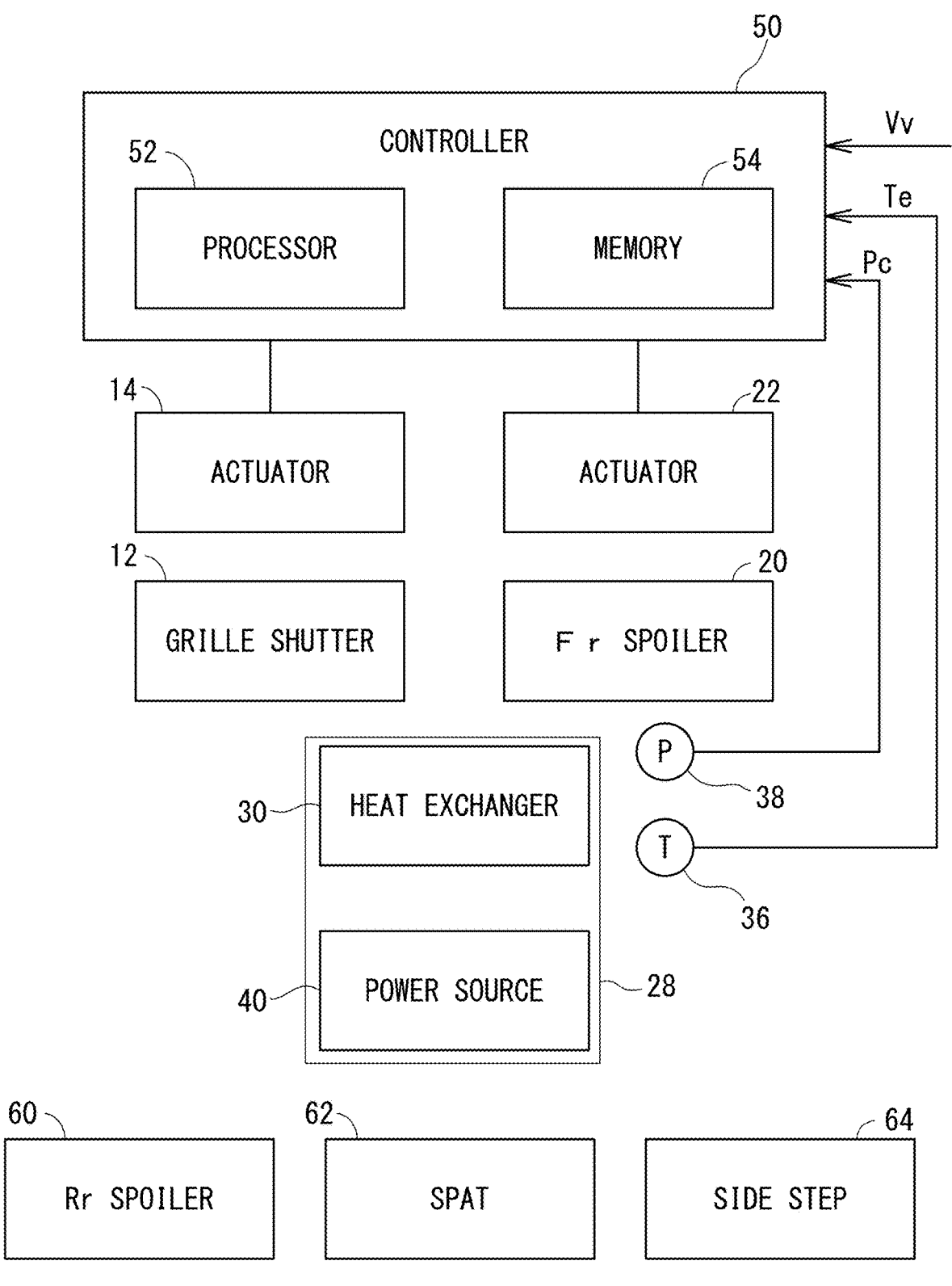
FIG. 1 is a block diagram showing a configuration of a vehicle.
Figure 2:
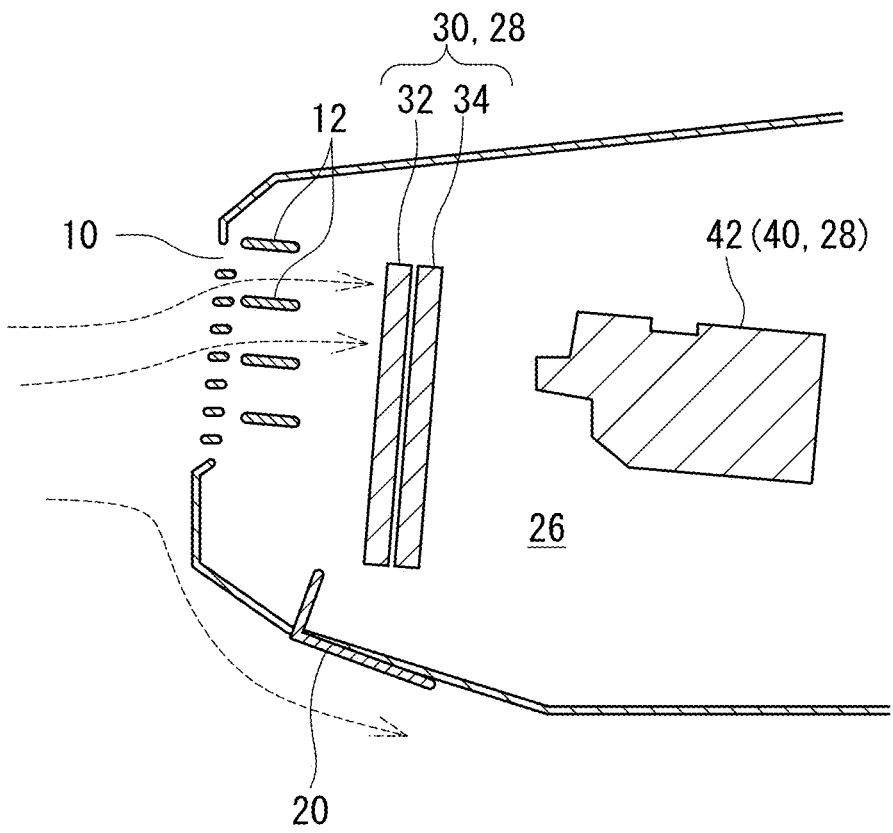
FIG. 2 is a cross-sectional view of the front portion of the vehicle when the Fr spoiler is in the storage posture.
Figure 3:
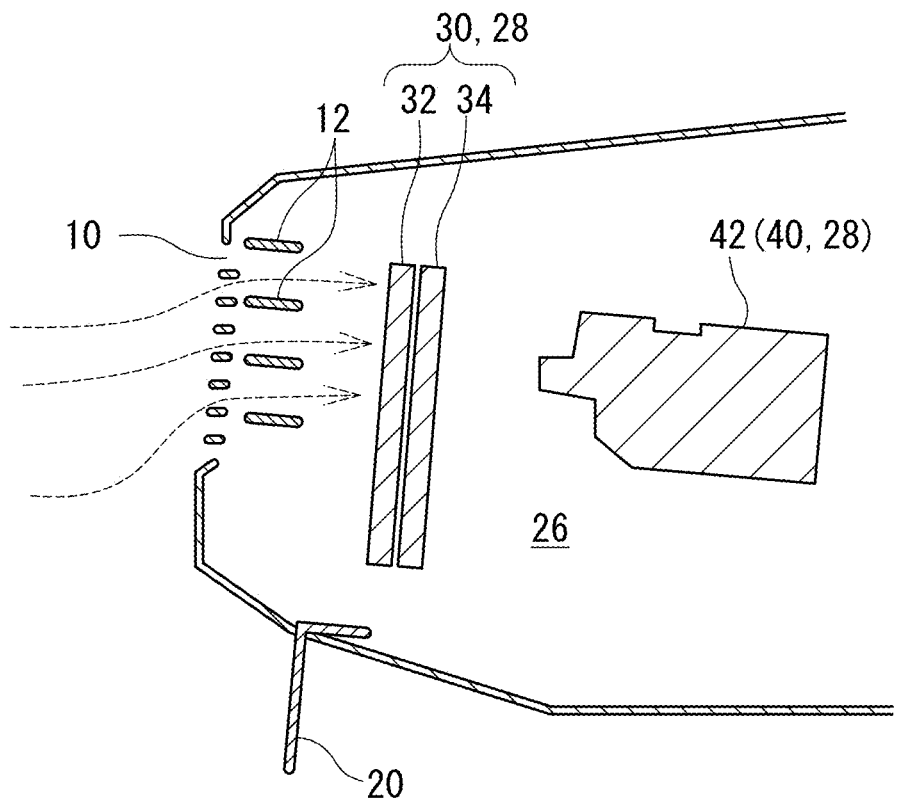
FIG. 3 is a cross-sectional view of the front portion of the vehicle when the Fr spoiler is in the deployed posture.

Hereinafter, a configuration of a vehicle having a grille shutter 12 and a front spoiler (hereinafter referred to as "Fr spoiler") 20 will be described with reference to the drawings. FIG. 1 is a block diagram showing a configuration of a vehicle. FIGS. 2 and 3 are schematic cross-sectional views of the front portion of the vehicle.

A power unit chamber 26 is formed in a front portion of the vehicle. A heat exchanger 30 and a power source 40 are disposed in the power unit chamber 26. The heat exchanger 30 causes the refrigerant to exchange heat with outside air. The heat exchanger 30 includes, for example, a radiator 32 for exchanging outside air and heat with cooling water of the engine 42, and a condenser 34 for exchanging outside air and heat with air-conditioning refrigerant.

A temperature sensor 36 and a pressure sensor 38 are provided near the heat exchanger 30. The temperature sensor 36 detects the temperature of the cooling water ant of the engine 42 (hereinafter referred to as "engine coolant temperature Te"). The pressure sensor 38 detects the pressure of the air conditioning refrigerant. That is, the air conditioning refrigerant is compressed according to the required air conditioning capability. The pressure sensor 38 detects the pressure of the air conditioning refrigerant after compression as the refrigerant pressure Pc. The detected engine coolant temperature Te and refrigerant pressure Pc are both transmitted to the controller 50.

The power source 40 outputs power for driving the vehicle. The power source 40 includes, for example, at least one of an engine 42 and a motor. In the example shown in FIG. 2, the power source 40 is an engine 42.

A grille opening 10 is formed in a front end face of the vehicle. The grille opening 10 is an opening for guiding the traveling wind to the power unit chamber 26. The heat exchanger 30 and the power source 40 arranged in the power unit chamber 26 are cooling targets 28 that are cooled directly or indirectly by running air. The engine coolant temperature Te and the refrigerant pressure Pc serve as evaluation indices indicating the temperature of the cooling target 28.

A grille shutter 12 is disposed behind the grille opening 10. The grille shutter 12 opens or closes the grille opening 10. In FIGS. 2 and 3, the grille shutter 12 is open. The actuator 14 for opening and closing the grille shutter 12 is controlled by a controller 50.

The actuator 14 is, for example, an electric actuator including a motor or an electromagnetic cylinder.

An Fr spoiler 20 is disposed below the vehicle. The Fr spoiler 20 is a movable aerodynamic device that can be changed between the storage posture and the deployed posture. In the storage posture, the Fr spoiler 20 substantially follows the bottom surface of the vehicle, as shown in FIG. 2. On the other hand, when the Fr spoiler 20 is in the deployed posture, as shown in FIG. 3, the Fr spoiler 20 protrudes downward of the vehicle as compared with the case of the storage posture.

The actuator 22 for changing the posture of the Fr spoiler 20 is controlled by the controller 50. The actuator 22 is, for example, an electric actuator including a motor or an electromagnetic cylinder. The actuator 22 is controlled independently of the actuator 14.

In the example of FIG. 1, the vehicle further includes a rear spoiler (hereinafter referred to as "Rr spoiler") 60, a spat 62 and a side step 64. The Rr spoiler 60, the spat 62 and the side step 64 are all movable aerodynamic devices. These movable aerodynamic devices 60, 62, 64 can be changed to a first posture and a second posture in which aerodynamic resistance can be reduced more than the first posture by an actuator (not shown).

The controller 50 controls the driving of the actuators 14 and 22, and hence the driving of the grille shutter 12 and the Fr spoiler 20. Such a controller 50 is physically a computer that includes a processor 52 and a memory 54. Although the controller 50 is illustrated as a single computer in FIG. 1, the controller 50 may be configured by combining a plurality of physically separated computers.

The controller 50 controls driving of the grille shutter 12 and the Fr spoiler 20 based on the engine coolant temperature Te, the refrigerant pressure Pc, and the vehicle speed Vv. Hereinafter, the control by the controller 50 will be described.

Normally, when the grille shutter 12 is opened, a larger amount of traveling air is sent to the cooling target 28 than when the grille shutter 12 is closed. Therefore, when the grille shutter 12 is opened, the cooling efficiency of the cooling target 28 is improved as compared with the case where the grille shutter 12 is closed. On the other hand, when the grille shutter 12 is opened, the air resistance increases as compared with the case where the grille shutter 12 is closed. The amount of improvement in cooling efficiency and the amount of increase in air resistance vary depending on the vehicle speed Vv.

When the vehicle runs at a low speed, the air resistance is small even when the grille shutter 12 is opened. In other words, when the vehicle is traveling at a low speed, there is almost no demerit caused by opening the grille shutter 12.

Accordingly, the controller 50 opens the grille shutter 12 when the vehicle speed Vv is less than the first threshold value V1 defined in advance. The first threshold value V1 is a value estimated to be small in air resistance. The first threshold value V1 is, for example, an arbitrary value satisfying 15 km or more and less than 50 Km per hour.

Further, when the vehicle is traveling at a very high speed, the load on the power source 40 (e.g., the engine 42) is large. In this case, even if the energy consumption increases as the aerodynamic resistance increases, it is required to efficiently cool the power source 40. Accordingly, the controller 50 opens the grille shutter 12 even when the vehicle speed Vv is equal to or greater than a third threshold value V3 defined in advance. Note that the third threshold value V3 is a value estimated to have a large load on the power source 40. The third threshold value V3 is, for example, an arbitrary value that satisfies a condition of 120 Km or more per hour.

When the temperature of the cooling target 28 (for example, the power source 40 or the heat exchanger 30) is high, it is required to rapidly cool the cooling target 28. Accordingly, the controller 50 opens the grille shutter 12 even when the evaluation index indicating the temperature of the cooling target 28 is equal to or greater than the reference value. Specifically, the controller 50 opens the grille shutter 12 when the engine coolant temperature Te is equal to or higher than a prescribed temperature reference value Tst or when the refrigerant pressure Pc is equal to or higher than a prescribed pressure reference value Pst.

On the other hand, when the above condition is not satisfied, the controller 50 closes the grille shutter 12. That is, when V1≤Vv<V3 and Te<Tst and Pc<Pst, the controller 50 closes the grille shutter 12. The above-described various threshold values V1, V3, Tst, and Pst may be fixed values that are invariant or may be variable values that vary depending on circumstances. The various threshold values V1, V3, Tst, and Pst may be values having hysteresis. For example, the first threshold V1 may include a lower first threshold V1_L and an upper first threshold V1_U higher than the lower first threshold V1_L. The controller 50 may open the grille shutter 12 when straddling the lower first threshold value V1_L in the course of decreasing the vehicle speed Vv, and close the grille shutter 12 when straddling the upper first threshold value V1_U in the course of increasing the vehicle speed Vv. The same applies to the other threshold values V2, Tst, and Pst.

Next, control of changing the posture of the Fr spoiler 20 will be described. As described above, the Fr spoiler 20 can be changed to the storage posture along the bottom surface of the vehicle and the deployed posture protruding downward from the vehicle. When the Fr spoiler 20 is in the deployed posture, the aerodynamic resistance of the vehicle is reduced as compared with the case of the storage posture. However, when the vehicle is running at a low speed, the aerodynamic resistance is small, and therefore, there are few advantages due to deployment of the Fr spoiler 20. Accordingly, in principle, the controller 50 deploys the Fr spoiler 20 when the vehicle speed Vv is equal to or greater than the second threshold value V2. Here, the second threshold value V2 is a speed larger than the first threshold value V1 and smaller than the third threshold value V3, and is a speed at which a certain degree of aerodynamic resistance is predicted to occur. The second threshold V2 is, for example, an arbitrary value that satisfies a condition of 30 km to 60 km per hour.

Further, when the Fr spoiler 20 is in the deployed posture, the cooling efficiency of the cooling target 28 is improved as compared with the case where the Fr spoiler 20 is in the storage posture. That is, when the grille shutter 12 is open, the traveling air flows from the grille opening 10 toward the cooling target 28. The cooling target 28 is cooled by the traveling wind. However, when the Fr spoiler 20 is stored, as shown in FIG. 2, a part of the traveling wind is not directed to the grille opening 10 but flows in the lower space of the vehicle. On the other hand, when the Fr spoiler 20 is deployed, as shown in FIG. 3, a part of the traveling wind cannot pass through the lower space of the vehicle, so that the traveling wind goes toward the grille opening 10. As a result, when the Fr spoiler 20 is deployed, the air volume toward the cooling target 28 increases as compared with the case where the Fr spoiler 20 is stored. As a result, in the deployed posture, the cooling efficiency of the cooling target 28 is improved as compared with the case of the storage posture.

Accordingly, the controller 50 deploys the Fr spoiler 20 even when the vehicle speed Vv is lower than the second threshold value V2 when the cooling target 28 is desired to be cooled efficiently, that is, when the grille shutter 12 is open. Thereby, the cooling target 28 is cooled more efficiently. However, when the vehicle is traveling slowly, the vehicle is likely to travel on a road surface having many obstacles, such as a parking lot. When the Fr spoiler 20 is deployed while traveling on a road surface having many obstacles, the Fr spoiler 20 may interfere with obstacles on the road surface. Therefore, even when the grille shutter 12 is open, the controller 50 does not deploy the Fr spoiler 20 when the vehicle speed Vv is less than the first threshold value V1. When the vehicle speed Vv is equal to or greater than the first threshold value V1 and less than the second threshold value V2, the controller 50 causes the Fr spoiler 20 to move to the deployed posture in synchronization with the opening of the grille shutter 12. Thereby, the cooling target 28 is cooled more efficiently.

Figure 4:
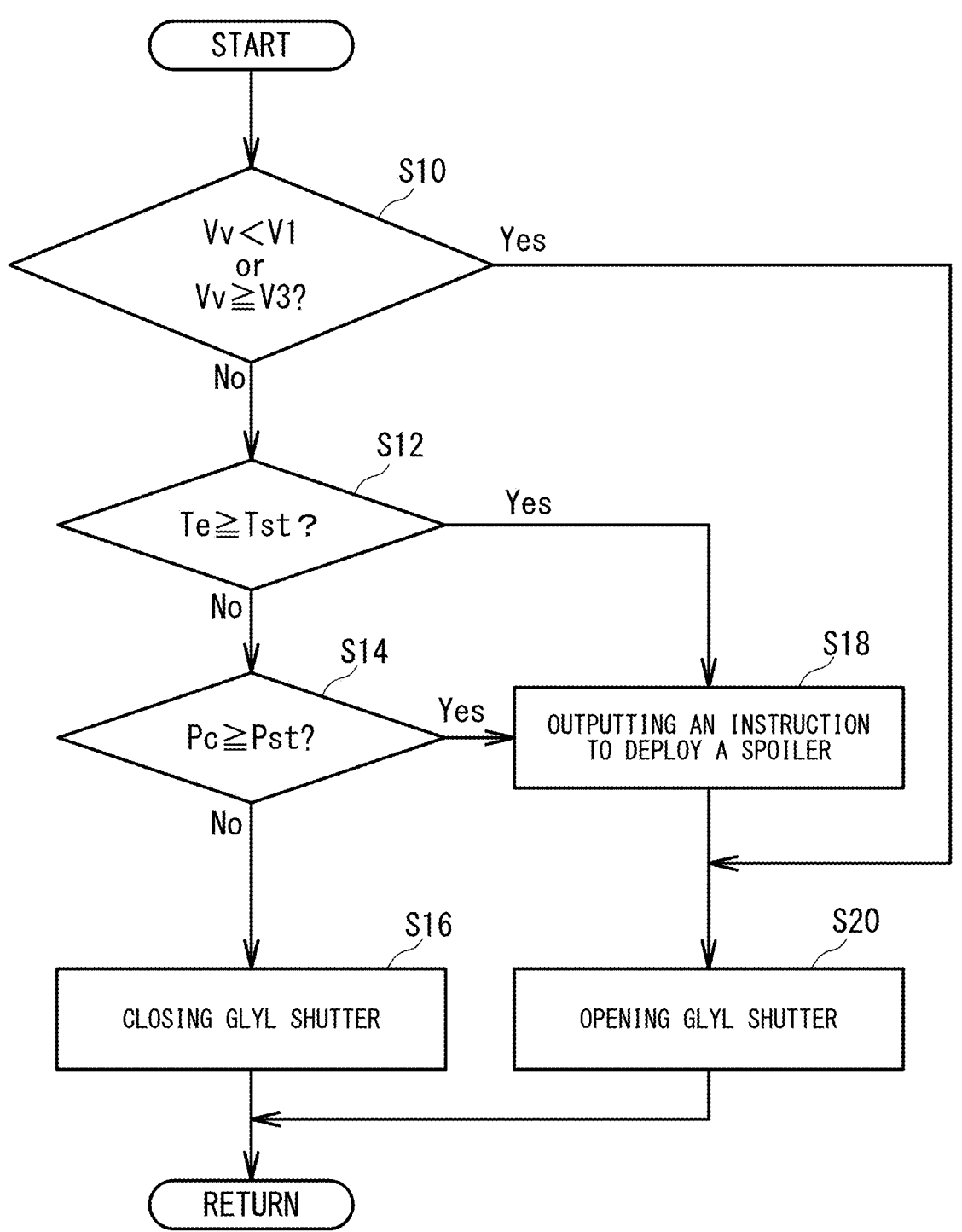
FIG. 4 is a flowchart showing a flow of drive control of the grille shutter.
Figure 5:
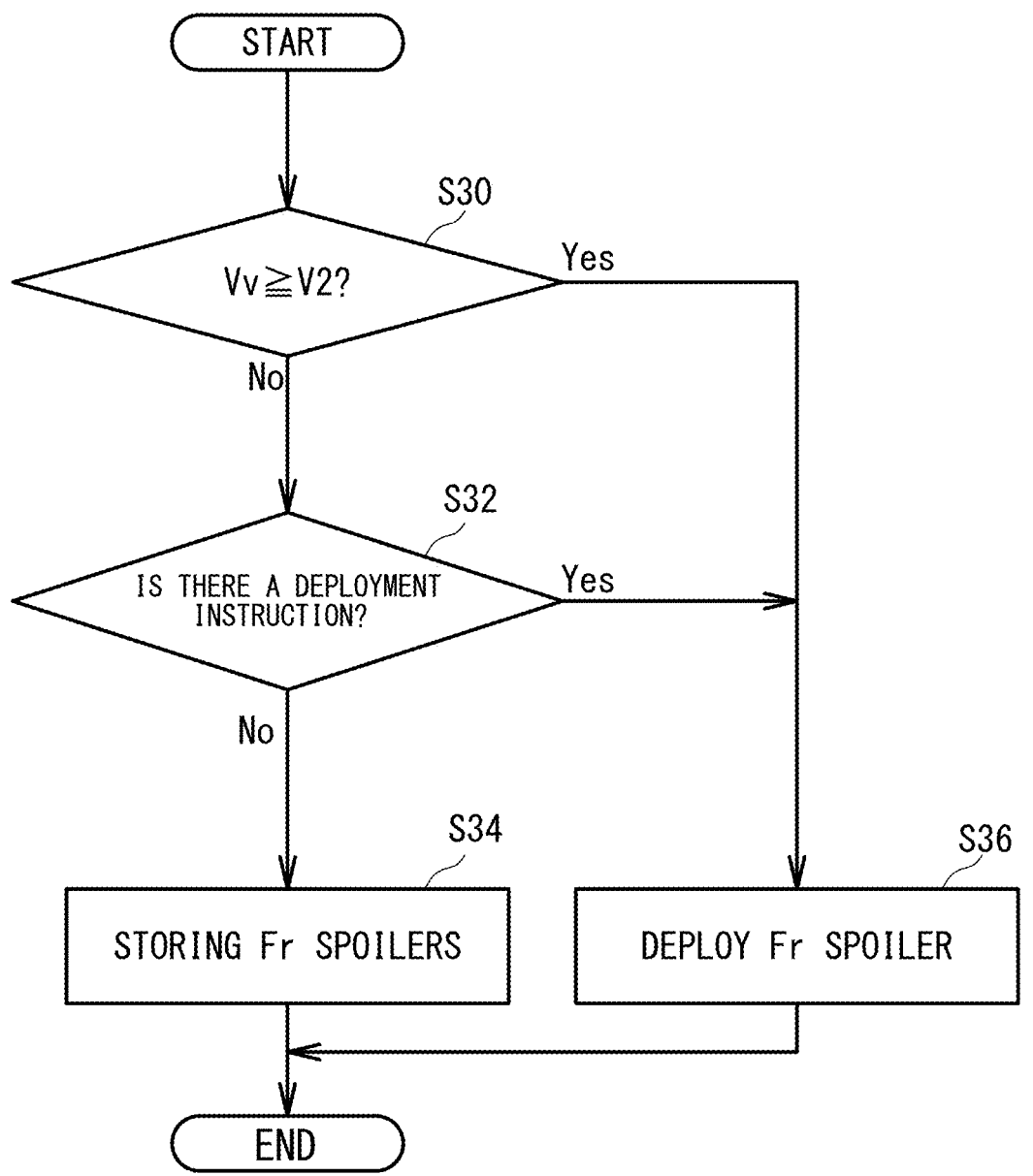
FIG. 5 is a flowchart showing a flow of driving control of the Fr spoiler.

Next, the flow of the drive control of the grille shutter 12 and the Fr spoiler 20 will be described with reference to FIGS. 4 and 5. As shown in FIG. 4, when the vehicle speed Vv is less than the first threshold value V1 or equal to or greater than the third threshold value V3 (Yes in S10), the controller 50 opens the grille shutter 12 (S20). On the other hand, when V1≤Vv<V3 (No in S10), the controller 50 compares the engine coolant temperature Te with the temperature reference value Tst (S12). When Te≥Tst (Yes in S12), the controller 50 outputs an instruction to deploy the Fr spoiler 20 and opens the grille shutter 12 (S18, S20).

When Te<Tst (No in S12), the controller 50 compares the refrigerant pressure Pc with the pressure reference value Pst (S14). When Pc≥Pst (Yes in S14), the controller 50 outputs an instruction to deploy the Fr spoiler 20 and opens the grille shutter 12 (S18, S20). On the other hand, when Te<Tst and Pc<Pst (No in S14), the controller 50 closes the grille shutter 12 (S16).

Next, the drive control of the Fr spoiler 20 will be described with reference to FIG. 5. The controller 50 executes the flow of FIG. 5 in parallel with the flow of FIG. 4. As shown in FIG. 5, when the vehicle speed Vv is equal to or greater than the second threshold value V2 (Yes in S30), the controller 50 sets the Fr spoiler 20 to the deployed posture. When the vehicle speed Vv is less than the second threshold value V2, the controller 50 confirms the presence or absence of the deployment instruction (S32). Even when the vehicle speed Vv is less than the second threshold value V2 (No in S30), when the deployment instruction is output in step S18 (Yes in S32), the controller 50 deploys the Fr spoiler 20 (S36). On the other hand, when Vv<V2 and no expansion instruction is given (No in S30 and No in S32), the controller 50 stores the Fr spoiler 20 (S34).

As is apparent from the above description, when the evaluation indices Te and Pc indicating the temperature of the cooling target 28 are equal to or greater than the reference values Tst and Pst, that is, when the cooling target 28 needs to be cooled, the controller 50 deploys the Fr spoiler 20. By deploying the Fr spoiler 20, a larger amount of traveling air is directed toward the cooling target 28, so that the cooling target 28 can be cooled more efficiently. If the cooling target 28 can be cooled early, the grille shutter 12 can be closed early. As a result, according to the technology of this example, the closing time of the grille shutter 12 can be increased. As a result, the total amount of aerodynamic resistance experienced by the vehicle can be reduced, and the energy consumption and hence the $CO_2$ emission can be reduced.

In the above description, only the Fr spoiler 20 is developed in synchronization with the opening of the grille shutter 12. However, the vehicle may have other movable aerodynamic devices. In this case, such other movable aerodynamic devices may also be pose-changed in synchronization with opening of the grille shutter 12. For example, consider a case where the vehicle has at least one of the Rr spoiler 60, the spat 62, and the side step 64 as another movable aerodynamic device. These other aerodynamic devices 60, 62, 64 can be changed to a first posture and a second posture in which aerodynamic resistance can be reduced more than the first posture. When the vehicle speed Vv is equal to or greater than the first threshold value V1 and less than the second threshold value V2, the controller 50 may change at least one of the Rr spoiler 60, the spat 62, and the side step 64 to the second posture in synchronization with the opening of the grille shutter 12. By changing the other movable aerodynamic device to the second posture, the load on the power source 40 is reduced and the temperature of the cooling target 28 is reduced early. Accordingly, the grille shutter 12 can be closed more quickly.

The configuration described above is an example. Accordingly, as long as the vehicle has the configuration described in claim 1, the configuration of the vehicle may be appropriately changed. For example, although a vehicle having the engine 42 as the power source 40 has been described as an example in the above description, the technology disclosed in the present specification may be applied to an electric vehicle having a motor as the power source 40. In the above description, the grille shutter 12 is opened when it is equal to or greater than the third threshold value V3. However, if the grille shutter 12 is opened when the evaluation index of the cooling target 28 is equal to or greater than the reference value, the other opening/closing conditions may be changed.

REFERENCE SIGNS LIST

10 grille opening, 12 grille shutter, 14 actuator, 20 front spoiler, 22 actuator, 26 power unit chamber, 28 cooling target, 30 heat exchanger, 32 radiator, 34 condenser, 36 temperature sensor, 38 pressure sensor, 40 power source, 42 engine, 50 controller, 52 processor, 54 memory, 60 rear spoiler, 62 spat, 64 side step.

The invention claimed is:

1. A vehicle comprising:
   a grille opening formed at a front end of the vehicle and configured to allow air to flow toward a cooling target;
   a grille shutter configured to enable the grille opening to open and close;

a front spoiler disposed at a lower front portion of the vehicle and configured to be capable of changing between a storage posture and a deployed posture protruding downward of the vehicle relative to the storage posture; and a controller, wherein the controller is configured to:

open the grille shutter when the vehicle speed is less than a first threshold value or when an evaluation index of a temperature of the cooling target is equal to or greater than a reference value, change the front spoiler to the deployed posture when the vehicle speed is equal to or greater than a second threshold value higher than the first threshold value; and change the front spoiler to the deployed posture in synchronization with the opening of the grille shutter when the vehicle speed is equal to or greater than the first threshold value and less than the second threshold value, the cooling target is a heat exchanger that causes an air conditioning refrigerant to exchange heat with outside air, and the evaluation index is a pressure of the air conditioning refrigerant.

2. The vehicle according to claim 1, wherein the cooling target further includes an engine, and the evaluation index further includes a temperature of cooling water for cooling the engine.

3. A vehicle comprising:

a grille opening formed at a front end of the vehicle and configured to allow air to flow toward a cooling target;

a grille shutter configured to enable the grille opening to open and close;

a front spoiler disposed at a lower front portion of the vehicle and configured to be capable of changing between a storage posture and a deployed posture protruding downward of the vehicle relative to the storage posture; and a controller, wherein the controller is configured to open the grille shutter when the vehicle speed is less than a first threshold value or when an evaluation index of a temperature of the cooling target is equal to or greater than a reference value, change the front spoiler to the deployed posture when the vehicle speed is equal to or greater than a second threshold value higher than the first threshold value; and change the front spoiler to the deployed posture in synchronization with the opening of the grille shutter when the vehicle speed is equal to or greater than the first threshold value and less than the second threshold value;

another aerodynamic device which can be changed to a first posture and a second posture in which an aerodynamic resistance of the vehicle is reduced as compared to the first posture, wherein the other aerodynamic device includes at least one of a rear spoiler, a spat, or a side step, and the controller is configured to change the other aerodynamic device to the second posture in synchronization with a change of the front spoiler to the deployed posture.

* * * * *